Dec. 6, 1932.   S. P. MILLER   1,889,757
PROCESS OF OPERATING CUPOLA FURNACES
Filed Nov. 18, 1930
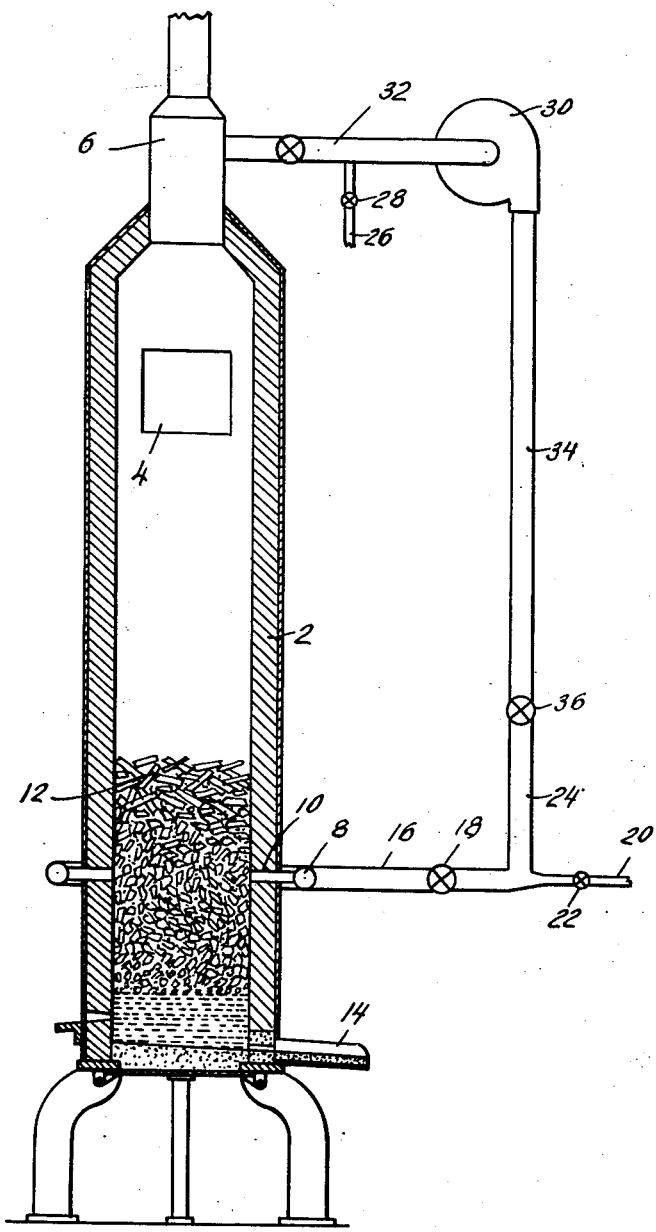
INVENTOR
Stuart Parmelee Miller
BY
ATTORNEY Patented Dec. 6, 1932

1,889,757

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

PROCESS OF OPERATING CUPOLA FURNACES

Application filed November 18, 1930. Serial No. 496,369.

My invention relates to the treatment of metals and alloys and particularly to the melting and refining of non-ferrous metals in cupola furnaces.

Ordinary cupola furnace operation involves the use of sufficient air to maintain the furnace at the desired temperature by combustion of the fuel. Since the air contains only about 20% oxygen, it is necessary to employ large volumes of air and high velocities of the air and gases through the furnace. The stack gases produced consist largely of the inert nitrogen of the air which serves no useful purpose in the operation and greatly increases the volume and velocity of the stack gases passing out of the furnace.

In melting non-ferrous metals in cupola furnaces using air to burn the fuel, many difficulties are presented due to the tendency of some metals when heated to volatilize and be swept from the furnace in vapor form by the stack gases. In melting alloys of metals containing constituents having vapor pressures which differ materially when in the molten condition, one of the metals of the alloy often volatilizes to such an extent during treatment of the alloy that the final product may differ materially in composition from the original material. For instance, when brass of relatively high zinc content is melted in a cupola furnace, the original material often contains considerably more of the more volatile metal, zinc, than is present in the final product. This is especially true of alloys containing the relatively volatile metals and elements—zinc, lead, antimony, magnesium, phosphorus and arsenic.

Furthermore, the character of the fuel employed in cupola furnace operation for melting the metal is an important factor. In ordinary cupola furnace operation for the melting and refining of non-ferrous metals, there is considerable difficulty in obtaining a product which is free from blow-holes and impurities which render the material useless or unsuitable for most purposes. As brought out in the reissue patent to Cushing No. 17,347, dated July 2, 1929, the use of pitch coke in melting metals in a cupola furnace results in the production of high grade products theretofore unattainable. One of the important advantages in the use of the high grade coke described in the Cushing reissue patent is the lower air pressure which may be employed in operating the furnace. This decreased air pressure is of advantage not only in that the loss of metal by oxidation is reduced but the loss of volatile products is materially decreased since the volume and velocity of the air passing through the furnace is much less than that normally employed for the melting of metals in cupola furnaces.

When the volume of the gases passed through the furnace and into contact with the fuel and metal is low, the amount of metal lost as volatile matter is small. On the other hand, if the volume of the air is relatively high, the loss of volatile metal in the outgoing gases is substantial. Moreover, the amount of sensible heat lost by the passage of hot gases from the furnace is decreased by the use of a smaller gas volume in the melting of the materials.

I have found that the advantages resulting from the use of cupola furnaces for the melting of metals and particularly non-ferrous metals, even when pitch coke is employed, can be increased still further and the losses due to the volatilization of metals and the passage of metal vapor from the furnace with the outgoing gases can be further reduced by the use of a much smaller amount of gas for supporting combustion of the fuel without reducing the amount of free oxygen supplied thereto. The use of oxygen, either alone or diluted with air, carbon dioxide, carbon monoxide, stack gases or other gases, will insure the supply of sufficient oxygen to effect combustion of the fuel without necessitating the passage of a large amount of inert nitrogen through the furnace as is the case when air alone is employed as the combustion supporting gas.

If pure or commercial oxygen is employed as the combustion supporting gas, and the fuel is burned completely to carbon dioxide, each cubic foot of oxygen introduced produces the equivalent of one cubic foot of carbon dioxide in the stack gases. However, when air is used to burn the fuel, five cubic feet of air containing four cubic feet of inert nitrogen must be introduced to burn the same amount of fuel and produce the same amount of heat. Therefore, when air is used, the equivalent of five cubic feet of stack gases are produced, consisting of one cubic foot of carbon dioxide and four cubic feet of nitrogen. The volume and velocity of the gases through the furnace therefore must be five times as great as when pure oxygen is used to burn the fuel, and the loss of metal in the form of vapor becomes a serious problem. Moreover, although combustion of the fuel produces the same amount of heat in each case, the heat is taken up by five times the volume of gas, so that the loss of heat in the stack gases is five times as great when air is employed as when oxygen alone is used.

In the usual practice of my invention, I prefer to employ oxygen to which air, carbon dioxide, or other gases have been added in various proportions.

If sufficient oxygen is supplied to the fuel to support combustion without the introduction of large volumes of diluent gases, the volume of the combustion supporting gases will be small and the volume and velocity of the stack gases will be reduced so that the loss of metal as volatile material is materially reduced. For example, a mixture of four parts of air, to which one part of oxygen has been added, contains 36% of free oxygen as compared with 20% of free oxygen contained in the air alone. The oxygenated air thus contained 1.8 times the amount of free oxygen present in an equal volume of air. Therefore, the oxygenated air may be supplied to the fuel at a velocity and in amounts which are only 55% as great as those necessary when air alone is employed to produce the same rate of combustion of the fuel. At the same time, the furnace may present the same oxidizing, neutral or reducing atmosphere with a much lower gas velocity. Furthermore, by the use of oxygenated gases containing oxygen in excess of that present in air, higher temperatures may be attained, the operation is more flexible, and the oxidizing or reducing nature of the atmosphere in the furnace is more readily controlled.

As pointed out above, the action of the inert nitrogen introduced when air is used for supporting combustion of the fuel is detrimental in melting and refining metals because it necessitates a high gas velocity so that the stack gases leaving the furnace carry a substantial amount of volatile metals with them. This action of the nitrogen of the air is particularly detrimental in melting metals and metallic alloys containing metals having relatively high vapor pressures. As indicated in International Critical Tables under "Vapor Pressure of Metals", Vol. 3, page 205, the vapor pressure of most of the non-ferrous metals is higher than that of iron. Therefore, my invention is primarily directed to the melting of non-ferrous metals and alloys of non-ferrous metals. The non-ferrous metals of greatest commercial importance are copper, nickel, aluminum, zinc, tin, and lead, and alloys of these metals with each other and with antimony, magnesium, phosphorus and arsenic. Therefore, the term "non-ferrous metals" as employed throughout the specification and in the claims, is intended to refer to the above mentioned metals and elements and to alloys in which they predominate.

Any suitable type of furnace may be employed in practicing my invention, but in order that my invention may be more clearly understood, I have illustrated diagrammatically in the figure of the drawing a sectional view of a cupola furnace having vertical walls 2, a charging door 4 for the introduction of fuel and metal, and a flue 6, through which the stack gases leaving the furnace pass. The furnace is provided with a bustle pipe 8 and tuyéres 10 for introducing the combustion supporting gases into the furnaces. The charge of fuel and metal 12 is located in the lower portion of the furnace and melted metal is drawn off through the outlet 14.

The oxygenated gases pass to the bustle pipe 8 through the pipe 16 which may be controlled by a valve 18. The oxygen passes to the pipe 16 through a pipe 20 controlled by the valve 22 and diluting gases such as air or stack gases pass to the pipe 16 through the pipe 24. When air is to be mixed with the oxygen the air may pass to the pipe 24 through the connecting pipe 26 controlled by valve 28. When the diluting gas is to be stack gases, the gases are withdrawn from the furnace by the blower 30 through the pipe 32 and passed to the pipe 24 through the pipe 34, controlled by valve 36.

In carrying out the present invention, fuel is charged into a cupola furnace. The fuel may be initially ignited and the furnace heated by passing air, either alone or mixed with oxygen, through the fuel. When the furnace is at the desired temperature, the charge of fuel and metal 12 is introduced through the charging door 4, and oxygenated gases are passed through the pipe 16, bustle pipe 8 and tuyéres 10 to the fuel. The pressure under which the oxygenated gases are introduced ordinarily need not exceed about two ounces per square inch. However, the pressure on the oxygenated gases employed in any particular case will depend largely upon the character of the metal being melted, the rate of melting, the temperature to be maintained in the furnace and the amount of free oxygen present in the gases introduced. The pressure of the gas introduced may be controlled during operation by means of the valve 18 and the amount of oxygen present in the gases passed into the furnace may be varied by controlling valves 22 and 28 or 36. Thus, relatively pure oxygen may be introduced into the furnace at first, and pressure, as well as the proportion of free oxygen to other gases, may be reduced or varied as desired during the melting operation. Ordinarily, however, the amount of free oxygen in the combustion-supporting gases is at least 25% of the total volume of gas introduced and the gas is introduced under a pressure of less than about one ounce. If the diluting gas itself contains free oxygen, as will be the case when the diluting gas is air, the amount of oxygen introduced with the diluting gas may be relatively small. In any event, when the amount of free oxygen present in the gases is greater than that in air, the volume of the gases introduced to support combustion of the fuel and effect the melting and refining of the metal will be less than that required when air alone is employed. For this reason, the velocity of the gases passing out of the furnace will be less than that necessary when air alone is used and consequently the loss of metal due to the removal of volatile material or metal vapor will be reduced. The heat loss by the removal of heat from the furnace as sensible heat of the stack gases also will be less than when air is employed as the combustion supporting gas.

A modification of my invention possessing advantages, particularly with respect to conservation of heat and increased efficiency of operation, is as follows. Stack gases from the upper portion of the cupola furnace are withdrawn through the pipe 32 and passed to the pipe 24 where they are mixed with oxygen or air and oxygen, introduced through the pipe 24 and recirculated to the furnace as combustion supporting gas. The stack gases are already heated to a high temperature so that they take up less heat in passing through the furnace than is taken up by the relatively cold inert nitrogen of the air ordinarily employed. Since the recirculated stack gases replace part or all of the nitrogen customarily introduced into the furnace as air and exhausted through the stack with the combustion gases, the total volume of gases exhausted through the stack, in this embodiment of my invention, is considerably reduced. This in turn results in a marked reduction in the loss of volatile metal as vapor from the furnace charge. This is of especial advantage in the melting of alloys such as bronze containing such volatile metals.

The temperature of the gases entering the furnace is raised by the heat contained in the stack gases withdrawn and recirculated to the furnace. The loss of fuel in heating the stack gases passing out of the furnace and in the stack gases which are not recirculated is greatly reduced since little inert nitrogen is passed through the furnace and a large amount of the stack gases are recirculated.

In any form of my invention, the efficiency of the process is increased by reason of the fact that in order to obtain a given temperature the gas velocities can be reduced and more nearly complete combustion of the oxygen is effected. Therefore, the operation does not require the use of large amounts of excess oxygen or air to burn the fuel completely as in the case when cupola furnaces are operated with air as the combustion supporting gas.

In the operation of my process, I prefer to employ, as the source of fuel, a coke low in ash, sulfur and volatile combustible matter, such as pitch coke or petroleum coke. The oxygenated gases may be introduced through the usual tuyères of the furnace or the diluting gases and oxygen may be introduced separately by means of additional tuyères or ports. The pressure under which the oxygenated gases are supplied to the furnace in using pitch coke can be much less than when ordinary coke is employed so that by using pitch coke when introducing oxygenated gases as described the velocity and amount of the gases introduced into and leaving the furnace will be still further reduced. Thus, the process is carried out with particular effectiveness when a cupola furnace is employed and the fuel employed is a coke of the kind referred to above.

I claim:

1. The process of treating metals which comprises introducing fuel and the metal to be treated into a cupola furnace, withdrawing stack gases from the furnace, mixing oxygen with the stack gases and burning the fuel by passing the mixed oxygenated gases into contact with the fuel.

2. The process of treating metals which comprises introducing fuel and the metal to be treated into a cupola furnace, withdrawing stack gases from the furnace and burning the fuel by passing the stack gases and a gas containing a greater amount of free oxygen than at present in air through the fuel in the furnace.

3. The process of treating metals which comprises introducing fuel and the metal to be treated into a cupola furnace, igniting the fuel, withdrawing a portion of the hot gases leaving the furnace, mixing the gases withdrawn while hot with a gas containing a greater amount of free oxygen than that present in air, and passing the hot mixture of gases into contact with the fuel.

4. The process of treating metals which comprises introducing pitch coke and the metal to be treated into a cupola furnace, withdrawing stack gases from the furnace, mixing a gas containing a greater amount of free oxygen than that present in air with the stack gases and burning the pitch coke by passing the mixed gases into compact with the pitch coke.

5. The process of treating non-ferrous metals which comprises introducing pitch coke and the metal to be treated into a cupola furnace, igniting the coke, withdrawing a portion of the hot gases leaving the furnace, mixing the gases withdrawn while hot with air and oxygen and passing the hot mixture of gases under a pressure not exceeding about two ounces into contact with the pitch coke.

6. The process of melting non-ferrous metals and alloys thereof which comprises introducing fuel and the metal to be melted into the cupola furnace, withdrawing stack gases from the furnace and burning the fuel by passing the stack gases and a gas containing at least 25 per cent of free oxygen through the fuel in the furnace.

7. The process of melting non-ferrous metals and alloys thereof which comprises introducing pitch coke and the metal to be melted into the cupola furnace, withdrawing a portion of the hot gases leaving the furnace, mixing the gases withdrawn while hot with a gas containing a greater amount of free oxygen than that present in air, and passing the hot mixture of gases into contact with the pitch coke.

8. The continuous process of melting non-ferrous metals and alloys thereof which comprises introducing pitch coke and the metal to be melted into a cupola furnace and burning the pitch coke by substantially continuously passing combustion-supporting gas containing at least 25 per cent of free oxygen through the pitch coke in the furnace under a pressure of less than about two ounces per square inch.

In witness whereof, I hereunto affix my signature.

STUART PARMELEE MILLER.